(12) United States Patent
Smith et al.

(10) Patent No.: US 8,701,826 B2
(45) Date of Patent: Apr. 22, 2014

(54) SHOCK ABSORBING LANYARD

(75) Inventors: Brad Smith, Bolton (CA); Peter Bishop, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 231 days.

(21) Appl. No.: 12/887,155

(22) Filed: Sep. 21, 2010

(65) Prior Publication Data

US 2012/0067666 A1   Mar. 22, 2012

(51) Int. Cl.
*A62B 35/04* (2006.01)

(52) U.S. Cl.
CPC ........................................ *A62B 35/04* (2013.01)
USPC .................................................... 182/3; 182/4

(58) Field of Classification Search
USPC ................ 182/3, 4, 5, 6, 7, 36, 145; 188/65.4
See application file for complete search history.

(56) References Cited

U.S. PATENT DOCUMENTS

| | | | | |
|---|---|---|---|---|
| 3,444,957 A * | 5/1969 | Ervin, Jr. | ............................ | 182/3 |
| 4,100,996 A * | 7/1978 | Sharp | ................................ | 182/3 |
| 4,253,544 A * | 3/1981 | Dalmaso | ............................ | 182/3 |
| 4,446,944 A | 5/1984 | Forrest et al. | | |
| 4,538,702 A * | 9/1985 | Wolner | .............................. | 182/3 |
| 5,090,503 A * | 2/1992 | Bell | ................................ | 182/5 |
| 5,113,981 A * | 5/1992 | Lantz | ............................ | 188/371 |
| 5,316,102 A * | 5/1994 | Bell | ................................ | 182/3 |
| 5,529,343 A * | 6/1996 | Klink | ............................ | 280/805 |
| 5,598,900 A * | 2/1997 | O'Rourke | ........................ | 182/3 |
| 5,658,012 A * | 8/1997 | Villarreal et al. | ............. | 280/805 |
| 5,960,480 A * | 10/1999 | Neustater et al. | .................. | 2/456 |
| 6,533,066 B1 * | 3/2003 | O'Dell | .............................. | 182/3 |
| 6,581,725 B2 * | 6/2003 | Choate | .............................. | 182/3 |
| 6,648,101 B2 * | 11/2003 | Kurtgis | ............................. | 182/3 |
| 6,698,544 B2 * | 3/2004 | Kurtgis | ............................. | 182/3 |
| 6,851,516 B2 * | 2/2005 | Petzl et al. | ........................ | 182/3 |
| 6,883,640 B2 * | 4/2005 | Kurtgis | ............................. | 182/3 |
| 6,990,928 B2 * | 1/2006 | Kurtgis | ......................... | 119/770 |
| 7,237,650 B2 * | 7/2007 | Casebolt | ....................... | 182/231 |
| 7,392,881 B1 * | 7/2008 | Choate | .............................. | 182/4 |
| 7,726,350 B2 * | 6/2010 | Jennings et al. | ........... | 139/383 R |
| 2003/0155177 A1 * | 8/2003 | Petzl et al. | ....................... | 182/3 |
| 2008/0190691 A1 | 8/2008 | Tanaka et al. | | |
| 2010/0252361 A1 * | 10/2010 | Wood | ................................ | 182/6 |
| 2011/0103558 A1 * | 5/2011 | Hooten | ............................ | 379/37 |

FOREIGN PATENT DOCUMENTS

WO   WO 95/01815 A2   1/1995
WO   WO 95/01815 A3   1/1995

OTHER PUBLICATIONS

Extended European Search Report, dated Jul. 9, 2012, corresponding to Application No. EP 11 18 1890.

* cited by examiner

*Primary Examiner* — Alvin Chin Shue
*Assistant Examiner* — Colleen M Chavchavadze
(74) *Attorney, Agent, or Firm* — Husch Blackwell LLP

(57) ABSTRACT

A lanyard has an energy absorbing section which exhibits an arrest force which goes from at least 3 kilo newtons to at least 5 kilo newtons when subjected to a load of 160 kg which free fell from 5.9 feet.

9 Claims, 7 Drawing Sheets ature. The outer sheet and the high elongation member are secured together at connection locations. The high elongation member is generally not secured to the outer sheet between the connection locations. The high elongation member can be formed from partially oriented yarn.

U.S. Pat. No. 6,533,066, Lanyard with Integral Fall Arrest Energy Absorber, O'Dell, discloses a shock absorbing lanyard having an integral fall arrest energy absorber formed in a one-piece woven, knitted or braided construction wherein partial oriented yarn (poy) fibers and high modulus yarn fibers are combined integrally in one section and are separate in another section. In the other section the high modulus yarn fibers preferable form a sheet around a core of POY fibers.

SHOCK ABSORBING LANYARD

FIELD OF INVENTION

The present invention concerns a shock absorbing lanyard. More particularly the invention concerns a lanyard having a portion which provides a fall arrest energy absorber.

BACKGROUND

Workers, exposed to the danger of falling, often wear safety harnesses or belts. The safety devices can be attached to a lifeline or lanyard. The lanyard in turn is securely affixed to a convenient anchorage point. Should the worker fall, his descent is quickly checked by the lanyard. A rapid deceleration of the falling worker caused by a sudden taughtness in the lanyard could result in serious bodily injury.

To reduce the potential for bodily injury, shock absorbing lanyards have developed to absorb a substantial portion of the kinetic energy generated during a fall. In this manner, the worker is decelerated gradually rather than being brought to an abrupt halt. To provide the gradual deceleration lanyards employ fall arrest energy absorbers such as elastic fibers, and tear away elements.

U.S. Patent Publication 2008/0190691, Shock Absorbing Lanyards, Tanaka, discloses a shock absorbing lanyard made as a one-piece webbing. The shock absorbing lanyard has a tubular-shaped high strength outer sheet and a high elongation member inside the outer sheet.

DETAILED DESCRIPTION

Figure 1:
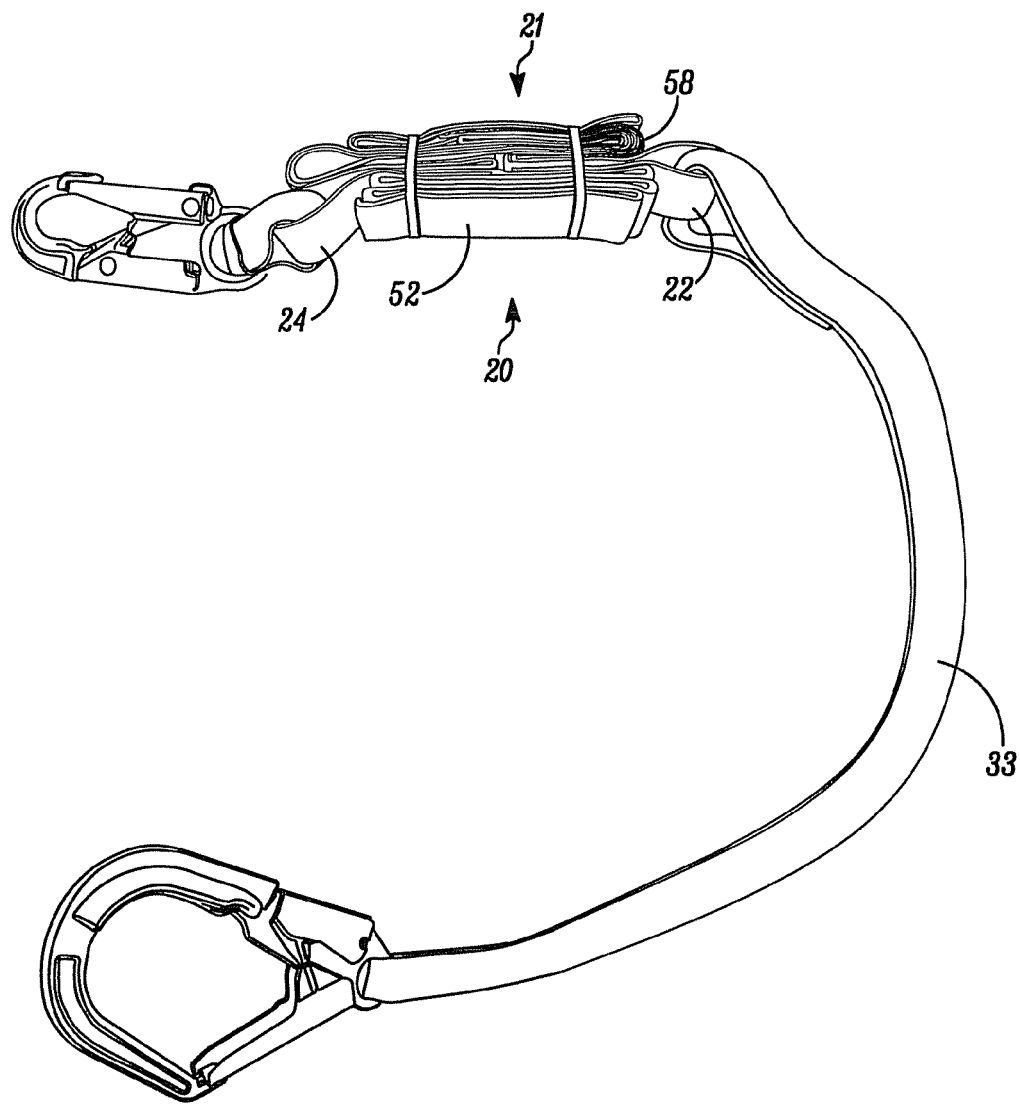
FIG. 1 is a top perspective view of a lanyard embodying the invention packed and ready for use by a worker.
Figure 2A:
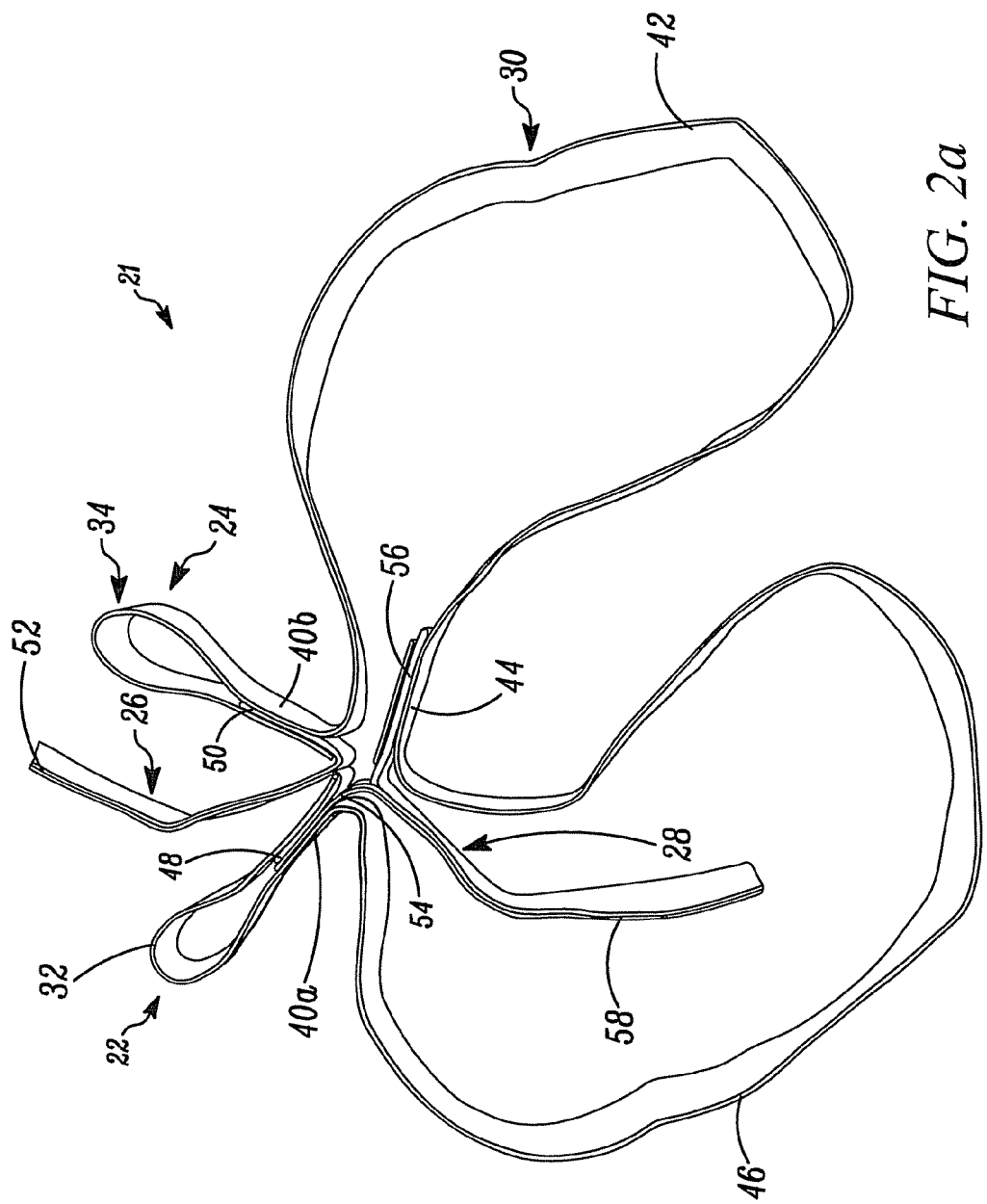
FIG. 2a is a front perspective view of the lanyard shown in FIG. 1, except the snap hooks and tethering extension have been removed; the lanyard has been removed from its packing and laid out to show the various portions and features of the lanyard; the lanyard has not been subjected to a force to tear apart its energy absorbing segments.
Figure 2B:
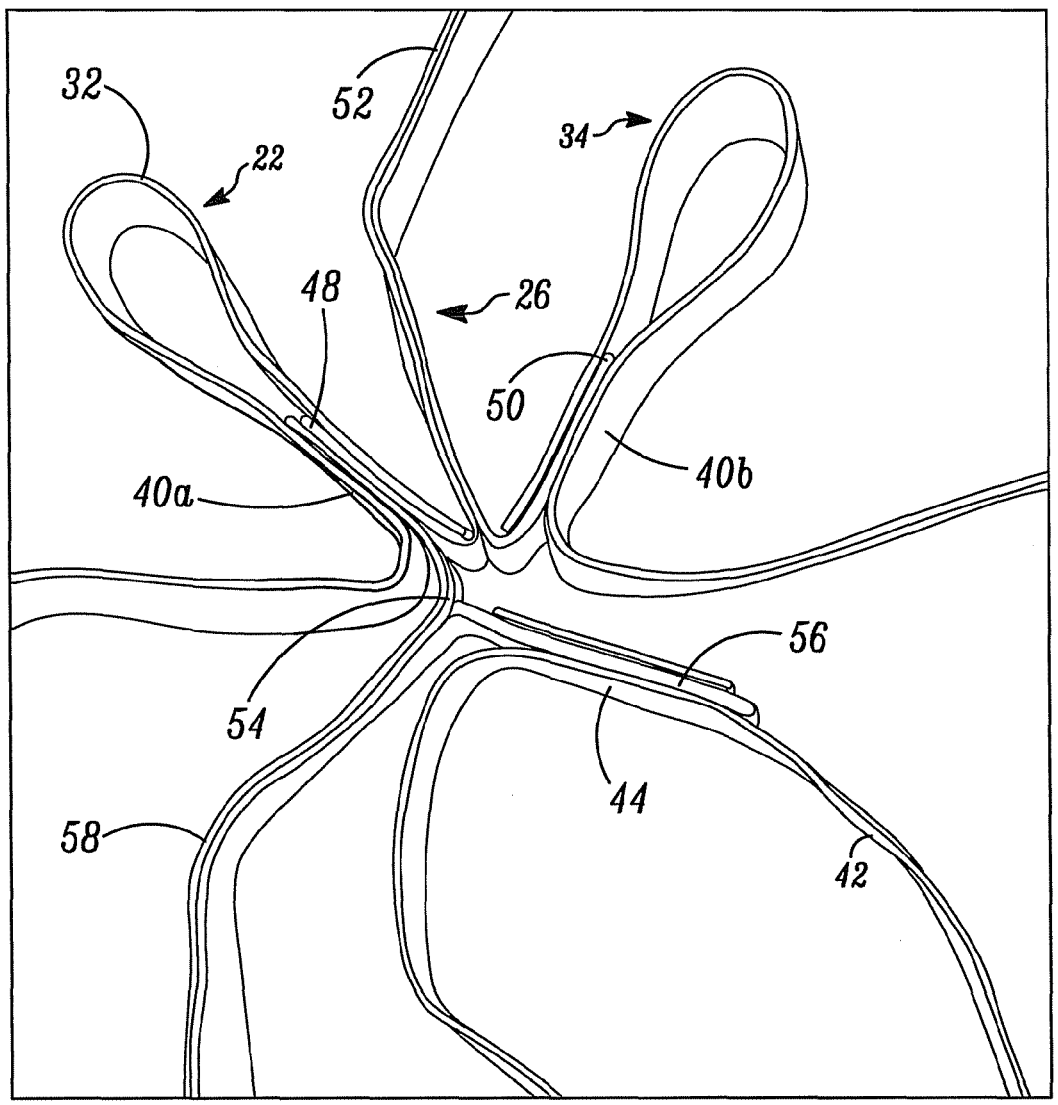
FIG. 2b is a blown-up view of a portion of the lanyard shown in FIG. 2.
Figure 3:
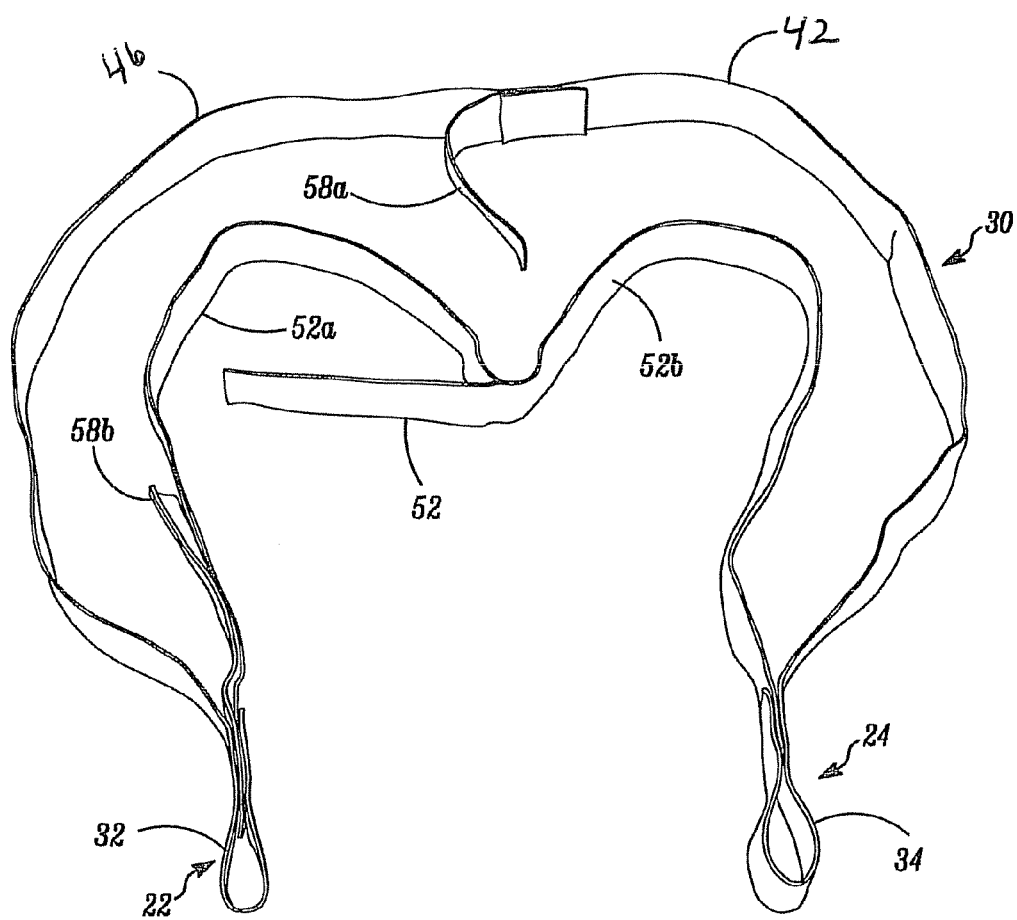
FIG. 3 is a top perspective view of a lanyard like the lanyard shown in FIG. 2; the lanyard has been subjected to a force to partially tear apart the energy absorbing portion of the first segment and completely tear apart the energy absorbing portion of the second segment.

FIGS. 1-3 discloses a preferred lanyard 20 which embodies the present invention. The lanyard has an energy absorbing section 21. The energy absorbing section has a first anchoring portion 22 at first lanyard area and a second anchoring portion 24 at a second lanyard area. Snap hooks are at each end of the lanyard. The snap hooks can be separated a distance X from each other. The distance X is the length of the lanyard from snap hook to snap hook when the lanyard is packed and ready for use, i.e., before the energy absorbing section 21 has been activated by a falling object. See FIG. 1. Although section 21 is shown packed only by bands it would also be packed with a plastic shrink wrap. In the present embodiment the distance X is 4 to 6 feet. The anchoring portions during a fall can be separated a maximum distance Y. The distance Y is up to 69 inches.

As shown in FIGS. 2-3, the lanyard 20 has an energy absorbing section 21 which includes first 26 and second 28 segments. Under sufficient load, such as the force caused by a falling worker, an overlapping or tear apart portion 52 of the energy absorber first segment 26 will at least partially tear apart, and the segment 26 will elongate. FIG. 3 shows the tear apart portion 52 partially torn apart into portions 52a, 52b. During tearing and elongation, the distance between the anchoring portions 22, 24 increases. While tearing, the energy absorber first segment 26 resists the force of the falling worker by absorbing kinetic energy from the fall, and decelerates the worker. If the worker does not come to a complete stop by the time the energy absorber first segment tears apart a maximum allowed by the a first folded over tether portion 42, than an overlapping or tear apart portion 58 of energy absorber second segment 28 may begin to tear apart. Whether overlapping portion 58 of the energy absorber second segment completely tears apart depends upon the weight of the worker and distance of the fall. During a tearing apart of the second segment 28, the first segment continues to tear apart. FIG. 3 shows the tear apart portion 58 completely torn apart into portions 58a and 58b. In any event, the distance between the anchoring portions will stop increasing when the distance reaches Y. The distance Y depends on the construction of the energy absorbing section's tethering member 30. The tethering member 30 does not elongate. Rather it unfolds from a folded or bunched orientation, see FIGS. 1-2, to a less folded or unfolded or unbunched orientation. See FIG. 3

FIG. 3 shows tether first 42 and second 46 folded over portions after lanyard 20 has been subjected to a force which tore portion 52 of the first segment partially apart and the portion 58 of second segment 28 completely apart.

In more detail the tethering member 30 of the energy absorbing section 21 has a first looped portion 32 at the first anchoring portion 22. The tethering member 30 has a second looped portion 34 at the second anchoring portion 24. A clasp, hook, latch or other fastener 36 is coupled to the first looped portion 32. A tether extension 33 is, coupled to the second looped portion 34. A clasp, hook, latch or other fastener is coupled to tether extension 33. The first loop portion 32 and second loop portion 34 have respective base portions 40a, 40b formed by stitching tether portions together.

The tether's first folded over portion 42 extends from second anchoring portion 24 to a portion of the lanyard between the first anchoring and second anchoring portion. The portion between is an intermediate portion 44. This is the tether intermediate portion 44.

The tether's second folded over portion 46 extends from said tether intermediate portion 44 to said first anchoring portion 22. As explained in more detail below, the first 42 and second 46 folded over portions unfold as the first 26 and second segment 28 of the energy absorbing section tears apart.

The energy absorber first segment 26 has a first end 48 connected to the tether 30 at the first anchoring portion 22. More particularly it is coupled to the base 40a of the first loop 32. The first segment 26 has a second end 50 coupled to the tether 30 at the second anchoring portion 24. More particularly, it is coupled to the base 40b of the second loop 34. The first segment's overlapping portion 52 extends between said first 48 and second ends 50 of said first segment 26. The overlapping portion is formed from overlapping portions 52a, 52b. The portions 52a, 52b are adhered together to form portion 52. The construction which adheres the overlapping portions 52a, 52b together exhibits a minimum arrest force of no less than 2 kilo newtons and a maximum arrest force greater than 3 kilo newtons and no more than 4 kilo newtons when subjected to a load of 160 kg which free fell from 5.9 feet. In more detail the falling object is attached to said lanyard at one end. The lanyard is attached to a fixed anchoring point at the other end. The object free falls 5.9 feet before the lanyard reaches its unfolded not yet activated length X. The object is free to continue to fall until its fall is stopped by the lanyard. The test is known as the Energy Absorbers Dynamic Drop Test.

Figure 4:
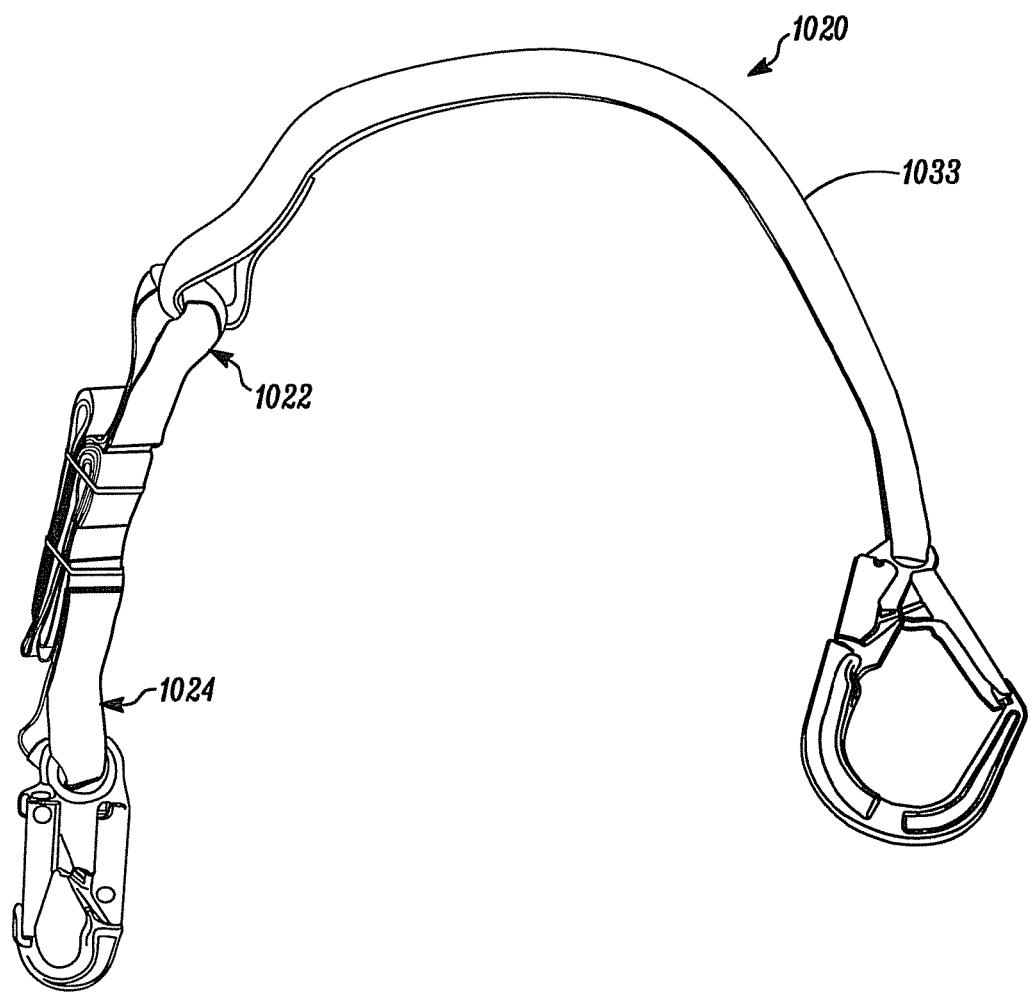
FIG. 4 is top perspective view of a lanyard showing an alternative embodiment of my invention; the lanyard is packed and ready for use by a worker.

The arrest force exhibited will go from 2 to 4 kilo newtons when subjected to the above load. The overlapping portion 52 can be called the first energy absorbing portion of the first segment 26. The overlapping portion 52 has a length greater than the length of the first tether folded over portion 42. Thus, the folded over portion 42 will completely unfold prior to a complete tearing apart of the overlapping potion 52. FIG. 4 shows the overlapping portion 52 partially torn apart into portions 52a and 52b.

The second segment 28 has a first end 56 connected to the tether 30 at the intermediate portion 44. The second segment 28 has a second end 54 connected to the tether at the first anchoring portion 22. More particularly it is coupled to the base 40a of the first loop. The second segment has an overlapping portion 58 which extends between the first 56 and second ends 54 of the second segment 28. The overlapping portion is formed from overlapping portions 58a, 58b. The portions 58a and 58b are adhered together to form portion 58. The construction which adheres the overlapping portion 58 together has an arrest force, which when combined with the arrest force of the first segment 26, exhibits a minimum arrest force greater than 4 kilo newtons and a maximum arrest force greater than 5 kilo newtons but no more than 6 kilo newtons. The arrest force calculated when the segments are subjected to the load of 160 kg which free fell from 5.9 feet. The arrest force exhibited will go from 4 to at least 5.5 kilo newtons when subjected to the above load. The overlapping portion 58 can be called the second energy absorbing portion of the second segment. The overlapping portion 58 has a length less than the length of the second tether folded over portion 46. Thus, the overlapping portion 58 will completely tear apart prior to unfolding of the second folded over portion. FIG. 4 shows the overlapping portion 58 completely torn apart into portions 58a and 58b.

In operation when the worker falls off a support such as a scaffold and the fall creates sufficient force the overlapping portion 52 of the first segment 26 begins to tear apart. The tearing apart causes the first segment 26 to elongate. The elongation is accompanied by an unfolding of the first folded over portion 42. The tearing apart absorbs kinetic energy from the fall thereby decreasing the speed at which a person is falling. If the person is 100-254 lbs the persons fall will be halted prior to second segment overlapping portion 58 tearing apart. If the person is 254-386 pounds the energy absorbing portion 58 of the second segment 28 will tear apart in a manner similar to the first segment. During a tearing apart, the second segment will elongate. The first segment will continue to elongate. The elongation will be accompanied by an unfolding of second folder over portion. The second energy absorbing portion 58 and first energy absorbing portion will continue to tear apart will continue to tear apart and absorb kinetic energy of the fall until the person is brought to a stop or until the second energy absorbing portion 58 completely tears apart, at which time the tether second folded over portion 46 will continue to unfold. As the length of the tether 30, completely unfolded, exceeds the length of the first and second segment, the first segment will continue to tear apart after the second segment has been torn apart.

The above described lanyard provides an energy absorbing section 21 with a construction that exhibits a minimum arrest force between 0 and 3 kilo newtons and maximum arrest force between 4 and 6 kilo newtons when subjected to the above described load. More particularly the construction exhibits a minimum arrest force greater than or equal to 2 kilo newtons and a maximum arrest force greater than 5 kilo newtons and no more than 6 kilo newtons when subjected to the above described load. The construction can fairly be said to exhibit an arrest force which goes from at least 2 kilo newtons to at least 5 kilo newtons when subjected to the load of 160 kg which free fell from 5.9 feet.

Figure 5:
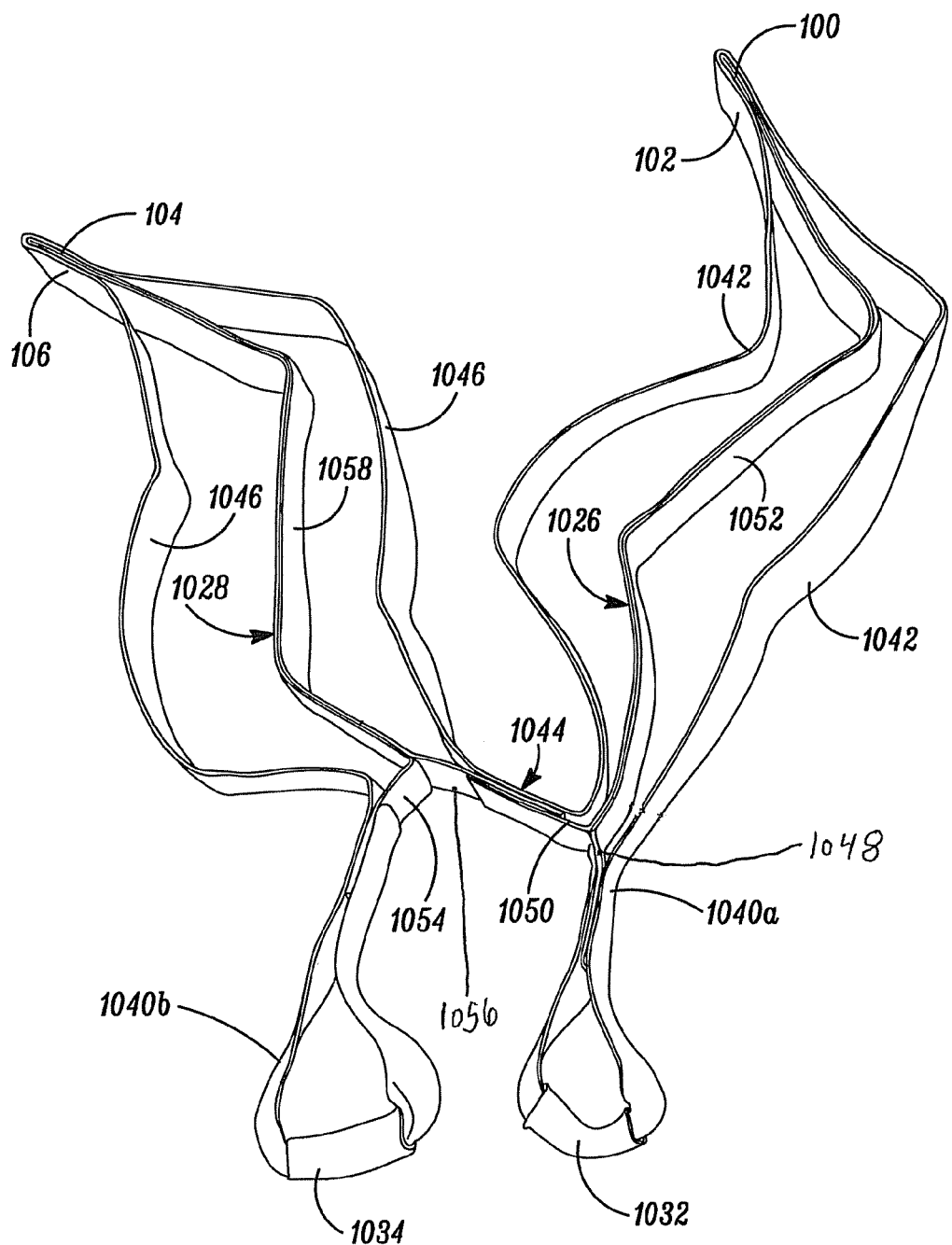
FIG. 5 is a front perspective view of the lanyard of FIG. 4 except the snap hooks and tethering extension have been removed; the lanyard has been removed from its packaging and laid out to show the various portions and features; the lanyard has not been subjected to a force to tear apart its energy absorbing segments.
Figure 6:
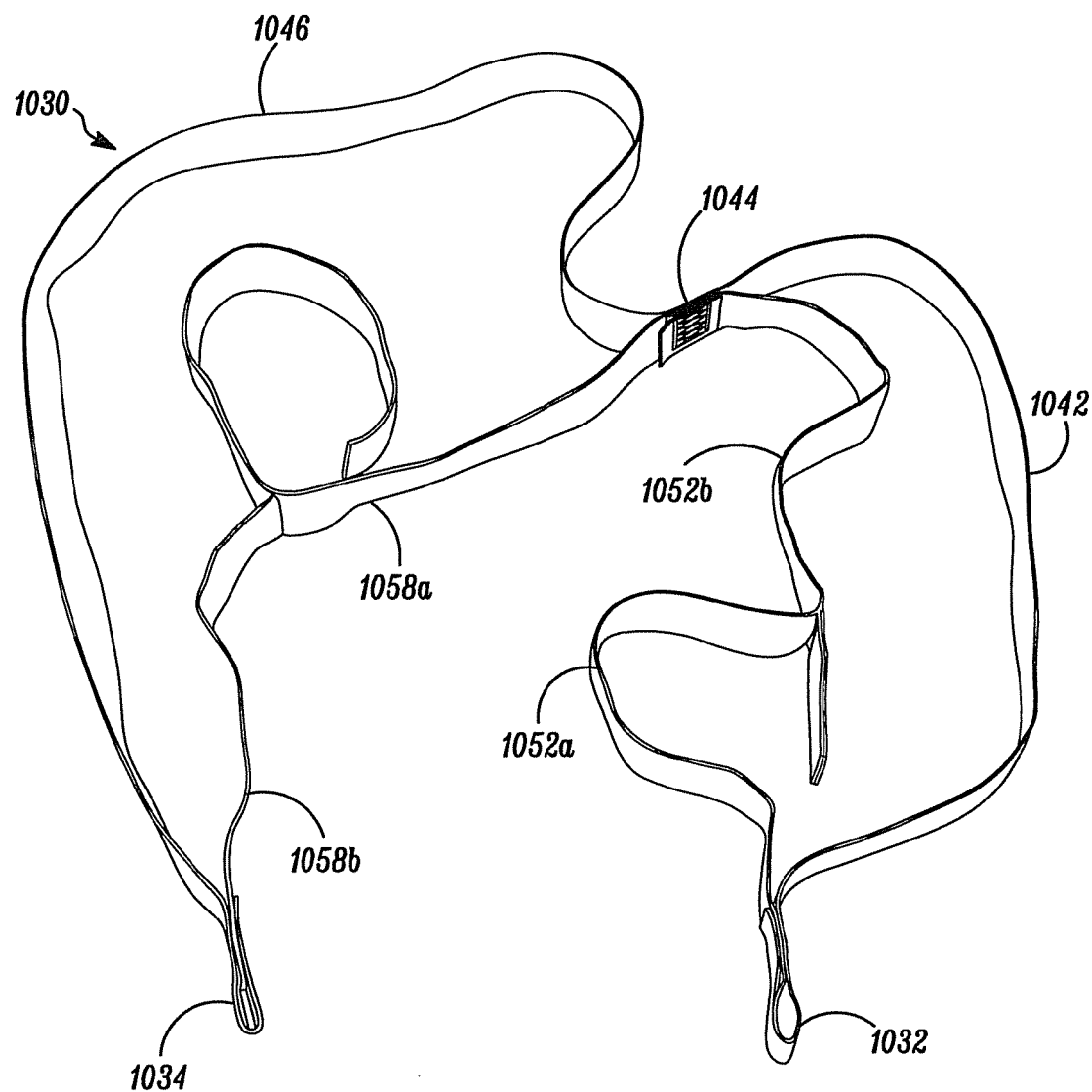
FIG. 6 is a top perspective view of a lanyard similar to a lanyard of FIG. 5; the lanyard has been subjected to a force to partially tear apart the energy absorbing portion of the first segment and the energy absorbing portion of the second segment.

FIGS. 4-6 show an alternative embodiment of lanyard 1020 which embodies the present invention. Lanyard 1020 has a construction similar to Lanyard 20. For simplicity the reference numbers used to call out elements of Lanyard 1020 have been used to call out similar elements found in Lanyard 20. Except the prefix "10" has been added to reference numbers of Lanyard 1020.

Lanyard 1020 includes first 1022 and second 1024 anchoring portions at first and second Lanyard ends. The lanyard includes a tether 1030. The tethering member has a first looped portion 1032 at the first anchoring portion 1022 and a second looped portion 1034 at the second anchoring portion 1024. A clasp, hook, latch, or other fastener 1036 is coupled to the first looped portion. A clasp, hook, latch, or other fastener 1038 is coupled to the second looped portion. The tether has a first folded over portion 1042 between tether intermediate portion 1044 and tether first anchoring portion 1022. The tether has a second folded over portion 1046 between tether second anchoring portion 1024 and tether intermediate portion 1044. The lanyard includes an energy absorbing portion formed from first 1026 and second 1028 segments. First segment 1026 is mounted to tether 1030 in a different manner than first segment 26 mounts to tether 30. First segment 1026 has its first end 1048 mounted to first loop base 1040a. First segment's second end 1050, however, is coupled to the tether intermediate portion 1044.

The second segment 1028 is mounted to tether 1030 in a manner different than second segment 28 is mounted to tether 30. The second segment 1028 first end 1054 is mounted to the tether intermediate portion 1044. The second segment second end 1056 is mounted to the base 1040b of the second loop 1034.

First segment 1026 has an overlapping portion 1052 between first 1048 and second 1050 ends of segment 1026. Second segment 1028 has an overlapping portion 1058 between first 1054 and second 1056 end of segment 1028. The first overlapping portion 1052 is formed from overlapping portions 1052a and 1052b. The first overlapping portion in this example is designed to tear apart before the second segment. Therefore the portions 1052a and 1052b of the first segment are adhered together with a construction that exhibits a minimum arrest force of at least 2 kilo newtons and a maximum arrest force greater than 3 kilo newtons but no more than 4 kilo newtons. The arrest force thus goes from 2 to at least 3.5 kilo newtons when subjected to a load of 160 kg which free fell from 5.9 feet. The overlapping portion 1058 of the second segment has a construction so its overlapping portions 1058a and 1058b are adhered together to exhibit a minimum arrest force no less than 3.4 kilo newtons and no more than and a maximum arrest force greater than 5 kilo newtons and no more than 6 kilo newtons when subjected to a load of 160 kg which free fell from 5.9 feet. The arrest force exhibited will go from 2 to at least 5 kilo newtons when subjected to the above load. The base 100 of the first overlapping portion 1052 may be stitched to the base 102 of the first folded over portion 1042 of the tether 1030. The base 104 of second segment overlapping portion 1058 may be stitched to the base 106 of the second folded over portion 1046 of the tether. The segments are designed to tear in series as opposed to at the same time.

FIG. 6 shows Lanyard 1020 after it has been subjected to a force which tore overlapping portion 1052 at least partially apart into portion 1052a and 1052b. The force also tore overlapping portion 1058 into portions 1058a and 1058b.

The invention claimed is:

1. A lanyard, said lanyard comprising:
    an energy absorbing section which exhibits a range of arrest forces having a minimum arrest force and a maximum arrest force when subjected to a load of 160 kg which free fell from 5.9 feet, wherein said energy absorbing section comprises:
    a first anchoring portion;
    a second anchoring portion;
    a tether having a first tether portion at the first anchoring portion and a second tether portion at the second anchoring portion;
    a first folded over portion formed by said tether which extends from said second anchoring portion to an intermediate portion of said lanyard;
    a second folded over portion formed by said tether which extends from said intermediate portion of said lanyard to said first anchoring portion of said lanyard;
    an energy absorbing first segment having first and second ends coupled to different portions of said tether; said first segment has a first energy absorbing portion between said first and second ends which exhibits a first range of arrest forces which encompasses said minimum arrest force, said first energy absorbing portion has a first leading end at which said first energy absorbing portion's ability to exert an energy absorbing force begins and a second trailing end at which said first energy absorbing portion's ability to exert an energy absorbing force becomes spent, an amount of material forms the second trailing end;
    an energy absorbing second segment having first and second ends coupled to different portions of said tether; said second segment has a second energy absorbing portion between said first and second ends which exhibits a second range of arrest forces which encompasses an arrest force greater than said minimum arrest force, said second energy absorbing portion has a first leading end at which said second energy absorbing portion's ability to exert an energy absorbing force begins and a second trailing end at which said second energy absorbing portion's ability to exert an energy absorbing force becomes spent, an amount of material forms the second trailing end; and wherein
    said first end of said first segment is coupled to said base portion of said first looped portion, said second end of said first segment is coupled to said base of said second looped portion.

2. The lanyard of claim 1 wherein said first tether portion forms a first looped portion having a base, said first looped portion and base forming said first anchoring portion;
    said second tethering portion forms a second looped portion having a base, said second looped portion and said base forming said second anchoring portion.

3. The lanyard of claim 2 further comprising a fastener coupled to the first looped portion.

4. The lanyard of claim 2 wherein
    said first end of said second segment is coupled to said intermediate portion of said lanyard, said second end of said second segment is coupled to said base of said second looped portion.

5. The lanyard of claim 1 wherein said first energy absorbing portion is formed by two overlapping portions adhered together; said overlapping portions at least partially tear apart when a force is exerted on said lanyard by a falling object attached to said lanyard at one end, said lanyard attached to a fixed anchoring point at the other end, said object is 160 kilograms and has free fallen 5.9 feet before the lanyard has reached its unfolded at rest length, said object is free to continue to fall until its fall is stopped by the lanyard.

6. The lanyard of claim 5 wherein said second energy absorbing portion is formed by two overlapping portions adhered together; said overlapping portions at least partially torn apart when a force is exerted on said lanyard by a falling object attached to said lanyard at one end, said lanyard attached to a fixed anchoring point at the other end, said object is 160 kilograms and has free fallen 5.9 feet before the lanyard has reached its unfolded at rest length, said object is free to continue to fall until its fall is stopped by the lanyard.

7. The lanyard of claim 5 wherein when the first segment is in a torn apart orientation, the first folded over portion formed by said tether is at least partially unfolded.

8. The lanyard of claim 6 wherein when the second segment is in a torn apart orientation, the second folded over portion formed by said tether is at least partially unfolded.

9. An energy absorbing section of a lanyard, said energy absorbing section exhibits a range of arrest forces having a minimum arrest force and a maximum arrest force when subjected to a load of 160 kg which free fell from 5.9 feet, wherein said energy absorbing section comprises:
    a first anchoring portion;
    a second anchoring portion;
    a tether having a first tether portion at the first anchoring portion and a second tether portion at the second anchoring portion;
    an energy absorbing first segment having first and second ends coupled to different portions of said tether; said first segment has a first energy absorbing portion between said first and second ends which exhibits a first range of arrest forces which encompasses said minimum arrest force, said first energy absorbing portion has a first leading end at which said first energy absorbing portion's ability to exert an energy absorbing force begins and a second trailing end at which said first energy absorbing portion's ability to exert an energy absorbing force becomes spent, an amount of material forms the second trailing end;

an energy absorbing second segment having first and second ends coupled to different portions of said tether; said second segment has a second energy absorbing portion between said first and second ends which exhibits a second range of arrest forces which encompasses an arrest force greater than said minimum arrest force, said second energy absorbing portion has a first leading end at which said second energy absorbing portion's ability to exert an energy absorbing force begins and a second trailing end at which said second energy absorbing portion's ability to exert an energy absorbing force becomes spent, an amount of material forms the second trailing end; and wherein said first end of said first segment is coupled to said base portion of said first looped portion, said second end of said first segment is coupled to said base of said second looped portion.

* * * * *